May 23, 1961

G. MERZ 2,985,865

CIRCUIT ARRANGEMENT FOR CONTROLLING A BUFFER STORAGE

Filed Oct. 15, 1958

2 Sheets-Sheet 1

INVENTOR.
G. MERZ

BY Robert Harding Jr.
ATTORNEY

May 23, 1961 G. MERZ 2,985,865

CIRCUIT ARRANGEMENT FOR CONTROLLING A BUFFER STORAGE

Filed Oct. 15, 1958 2 Sheets-Sheet 2

INVENTOR.
G. MERZ

BY Robert Harding Jr.
ATTORNEY

United States Patent Office 2,985,865

Patented May 23, 1961

2,985,865

CIRCUIT ARRANGEMENT FOR CONTROLLING A BUFFER STORAGE

Gerhard Merz, Rommelshausen, Germany, assignor to International Standard Electric Corporation, New York, N.Y., a corporation of Delaware Filed Oct. 15, 1958, Ser. No. 767,380

Claims priority, application Germany Oct. 31, 1957

8 Claims. (Cl. 340—172.5)

Figure 1:
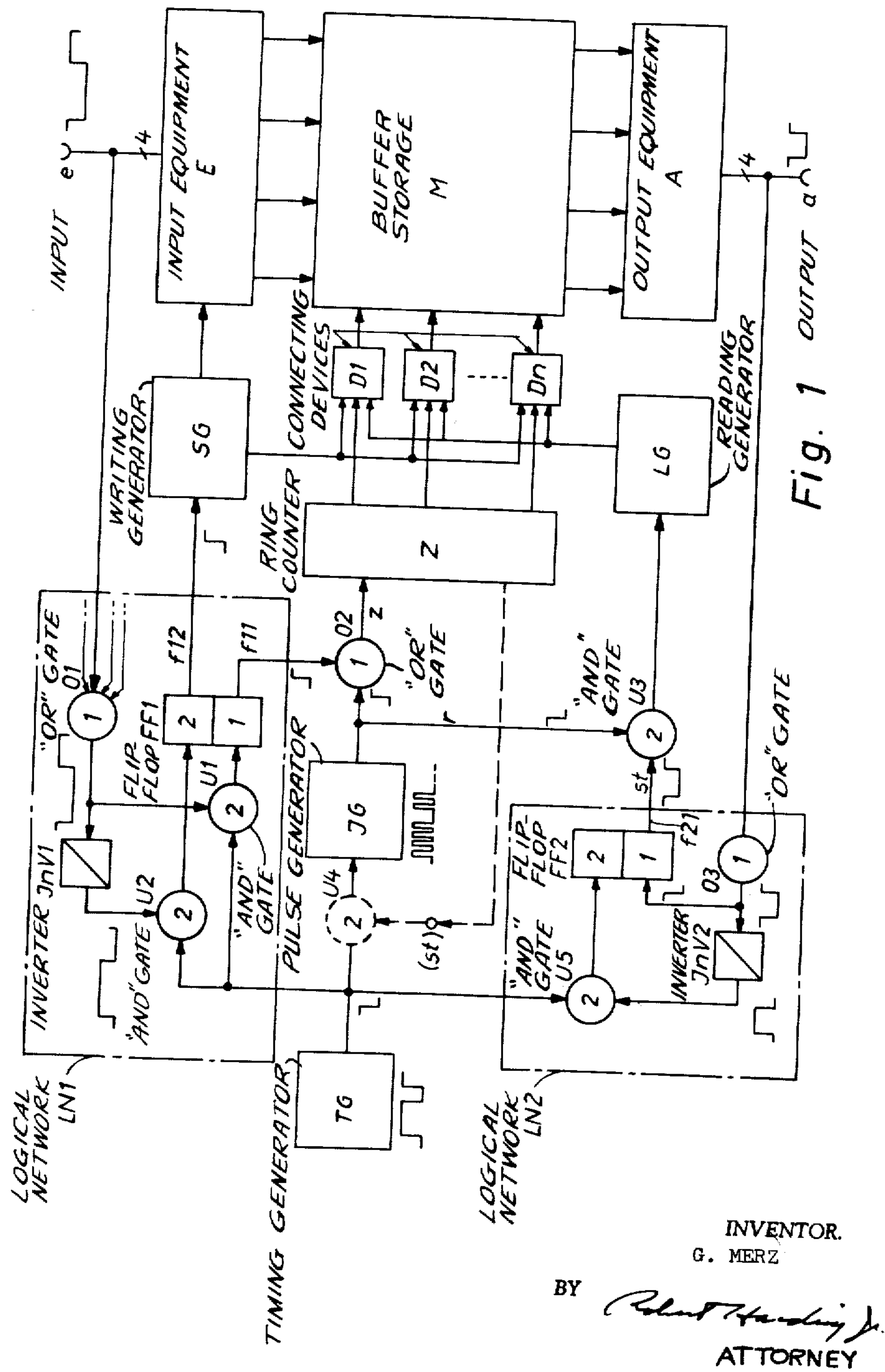

This invention relates to a circuit arrangement for controlling a buffer storage, in particular to an arrangement for setting up storage key senders for use as an adapter between button and pulse dialing, e.g. in semi-automatic switching systems, in P.A.B.X systems as well as in electronic exchange systems, or as used in the computer field as input devices or respectively as control devices in programming units.

Buffer storages which are controlled in this way serve the problem of storing a limited number of informations, which are supplied in a predetermined code in an irregular order of sequence (e.g. by the depression of buttons) and of transferring these informations in accordance with requirements in an unchanged order of sequence. Since, in this case, the feeding-in and feeding-out of the informations is not performed synchronously, prior art buffer storages were operated in connection with separate counters for controlling the input and the output, one counter being synchronously stepped-on with the input, and the other counter being stepped-on synchronously with the output. According to the counter positions the access to one or the other group of storage elements is selected. For example, the access to one line of a ferrite-matrix storage device is selected via gating devices, of which respectively one is assigned to each counting stage.

In conventional types of arrangements of this kind the investment for the control, in particular for the two counting devices, is a very high one. The circuit arrangement for control of the above mentioned gating devices is, in addition thereto, extremely complicated and susceptible to interferences.

According to the present invention these disadvantages are avoided in an arrangement employing one counting device only. In a circuit arrangement for controlling a buffer storage serving to receive irregularly supplied informations over an input circuit, and for the reproduction of which in an unchanged order of succession upon being read via one output circuit, there is assigned to each group of storage elements (e.g. of one line) of the buffer storage one gating device for selecting the access. Further, according to the invention, there is provided a single ring counter for the control of the gating devices for transmitting the information from the input circuit to the buffer storage and from the buffer storage to the output circuit. The ring counter is connected with control means and pulse generators so that after each recording process, it is advanced one step by the action of a primary pulse and that for performing a reading process in an interval between two primary pulses is advanced in a step-by-step manner during one complete rotation by the action of secondary pulses. This arrangement bears the advantage that both the writing and the reading process are blocked with respect to one another so that writing cannot be performed during reading, and vice versa.

This circuit arrangement as well as the further modifications according to the invention are in particular suitable for the construction of storage key senders. The arrangement, as will be shown hereinafter, can be designed in such a way that it will deliver the entire content of the storage device in the course of one reading process. The delivery can be controlled automatically in dependency upon the position of the counter. Another type of embodiment provides that in each reading process there is only delivered the information which, in the order of sequence of all stored informations, assumes the lowest position.

Figure 2:
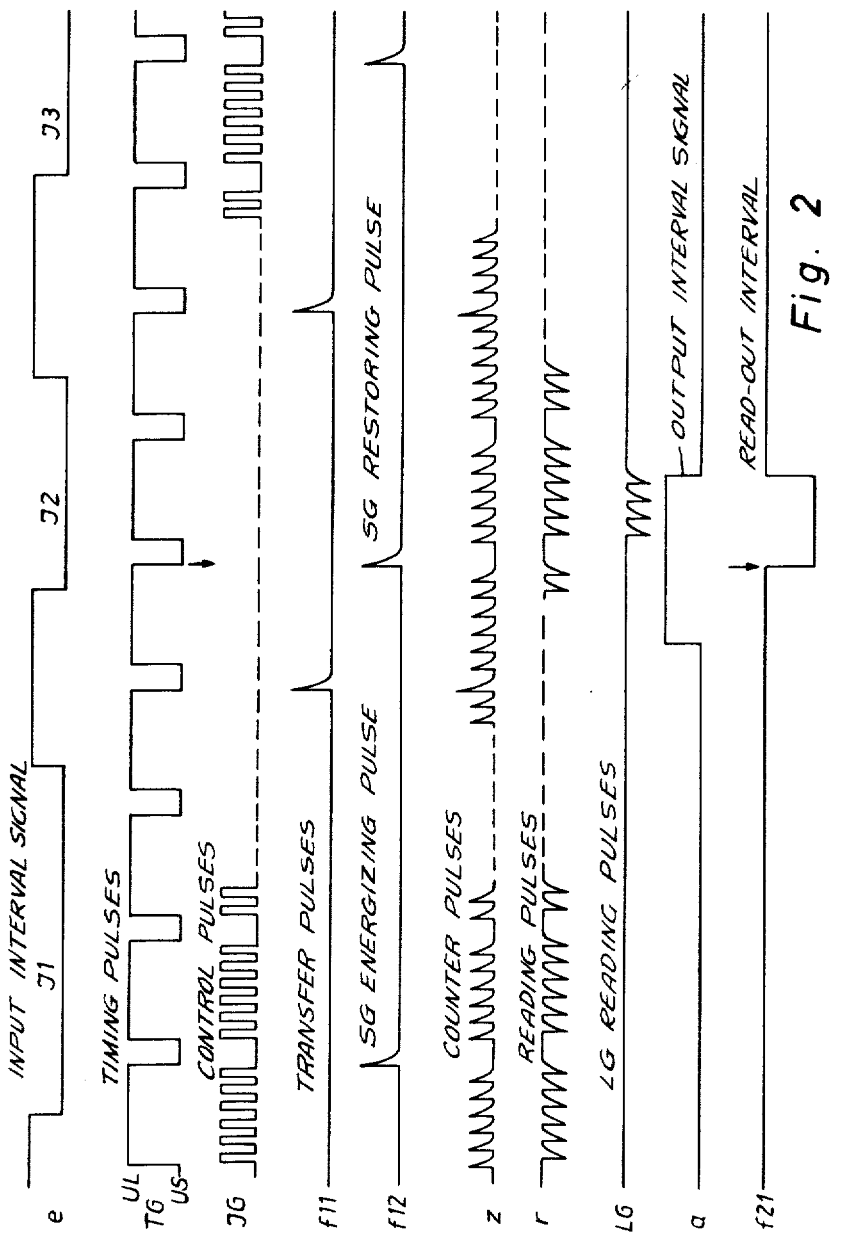

With the arrangements according to the invention there is achieved a substantial simplification of the circuit construction as well as an increased service reliability in that the synchronizing of the writing and reading processes is carried out automatically. Further details and advantages of the invention will now be described in the following with reference to an exemplified embodiment shown in the accompanying drawings, in which:

Fig. 1 shows a circuit arrangement for controlling a ferrite matrix storage device, and Fig. 2 shows a pulse diagram relating to the information input, the timing device, the logical network, the primary and secondary pulses, and to the information output.

An exemplified embodiment relating to the control of a buffer storage according to the invention is shown in Fig. 1. It is assumed that the buffer storage M is designed as a ferrite matrix storage comprising four columns and *n* lines 1 . . . *n*, to which the informations (consisting e.g. of four code elements) are fed in parallel through an input E, and stored in the matrix. As is shown by the basic circuit diagram there is provided for the writing process a writing generator SG which is connected with the input E as well as with the connecting -through devices D1 . . . D*n*. For the reading process, a similar arrangement is disclosed. Hereinafter, the input circuit will be briefly designated as SG and E, and the output circuit will be termed hereinafter briefly LG and A.

The buffer storage device M may consist of an array of magnetic cores arranged in horizontal and vertical rows. Input driving equipment and associated write generator, hereinafter termed input E, controls the writing-in of information and output driving equipment and associated read generators, hereinafter termed output A, controls the reading out of information. The access or selection, together with the sequencing, is controlled by the connecting devices D1 to DN and ring counter Z which respond to control from logical networks LN1 and LN2.

The matrix M, the input E and output A, and the associated generators and counters may be of the well-known type and may be similar to matrices and driving equipment described in the book High Speed Computing Devices, by Engineer Research Associates Staff, published by McGraw-Hill Book Company. The gating devices D1 . . . D*n* are connected to the outputs of a counting device Z, whose position determines the access selection for writing and reading processes.

The informations which are to be stored, are applied to the input E via the inlet *e* which, in the case of a parallel input, consists of four channels which correspond respectively to the noted vertical rows. With respect to the case wherein the individual code elements of an information are delivered in series, it is assumed that input E includes a well-known input register having storage units for respective rows which enables the parallel transmission to the storage device M. Similarly, with respect to the output A, it is assumed that it includes a well-known output register from which the outgoing informations can be delivered either in parallel or in series to the outlet *a*.

As may be taken from the basic circuit diagram as shown in Fig. 1 there is provided for controlling the counting device a timing device TG, a logical network LN1, as well as a pulse generator IG. The timing or rhythm device delivers successive marking potentials for the writing and reading rhythms, as is indicated by the curve TG in Fig. 2. The output of the timing device is connected with an input of the logical network LN1 and is connected with the input of the pulse generator IG. Under the control of the marking potential UL for the reading rhythm the pulse generator is released and delivers, for the duration of its release, output pulses whose period is so dimensioned that, during one reading rhythm, the primary pulses which are fed to the counter will just effect one complete rotation of the counter.

The logical network LN1 which is connected with its second input to the inlet *e*, consists of a flip-flop circuit FF which is connected with its control leads via respectively one AND-gate U1 and U2 with the output of the timing device, and of a supervisory circuit which is constituted of one OR-gate O1 with a subsequently arranged inverter I*n*V1. Gate O1 has four inputs corresponding respectively to the noted four channels. In this case, the logical network is arranged in such a way that the OR-gate O1 with its inputs connected, for parallel applied informations, to the input channels, or else in the case of serially applied informations, to the corresponding input register in the input circuit. Accordingly, the input of the OR-gate, that is, the second input of the logical network, is of the multipolar type corresponding to the number of code elements representing an information. Furthermore, the supervisory circuit is arranged in such a way that the OR-gate via its output, which is connected to the one AND-gate U1, will open the latter gate whenever an information is applied to the input *e*. The OR-gate will open the other AND-gate U2 which is connected with the output of the inverter In V1 in cases where no information is applied. The outputs of the flip-flop circuit FF1 are wired as outputs of the logical network. The output *f*11 is connected via one OR-gate O2 with the counter Z. The other input of this OR-gate O2 is applied to the output of the pulse generator IG. The output *f*12 of the flip-flop is connected with the input of the writing generator SG in the input circuit. Between the output of the pulse generator IG and the input of the reading pulse generator LG of the output circuit there is connected as a reading gate an AND-gate U3.

The mode of operation of the circuit arrangement is illustrated by the plotted pulses or pulse edges and by the pulse diaphragm as shown in Fig. 2. According to curve *e* in Fig. 2 it is assumed that successively three informations I1, I2, and I3 are applied to the input *e*. For the time of application of an information or input interval signal there is opened via the OR-gate O1 and AND-gate U1 and, at the same time there is blocked, via the reversing stage I*n*V1, arranged subsequently to the OR-gate, the AND-gate U2. However, if no information or input interval signal is applied, then U1 will be blocked and U2 will be unblocked.

The connection to the timing device for the controlling of the flip-flop circuit FF1 is such that there are only utilized the pulse edges at the transition from the marking potential UL for the reading rhythm, to the marking potential US for the writing rhythm.

If no information has been applied for some time then the flip-flop circuit FF1 will have been tilted into its position 1. If now the information I1 is applied to the input *e* then U1 will permit the passage of the pulse edges from the timing device, and the first one of these edges will effect the tilting of the flip-flop FF1 from its position 1 into position 2. At this moment and via the output *f*12 the writing generator SG will be excited. It is also assumed in this case that at the output of the flip-flop there are only utilized the pulse edges during its tilting, more specifically only short pulses will be flowing on the ouput lines, as is schematically denoted in curves *f*11 and *f*12. After the first pulse edge has tilted the flip-flop FF1 into position 2 the pulse edges will remain ineffective as long as the information 1 is applied, during the transition from UL to US. In the following interval between the informations I1 and I2, the gate U1 will be blocked and, at the same time, U2 will be unblocked. The first pulse edge appearing during the interval will then cause the flip-flop FF1 to be tilted back into its position 1, thus producing at the output *f*11 a transfer pulse which will be applied to the counter via the OR-gate O2.

When the next pulse edge appears, the information will already be applied to I2, so that FF1 will be relaxed anew and, via *f*12, a releasing pulse will be transferred to the writing pulse generator. As a result of the first pulse edge appearing during the interval between the informations I2 and I3, a further transfer pulse will be transmitted via *f*11. As will be seen from the curves *e* through *f*12 in Fig. 2 the logical network LN will transfer the releasing pulses applied to the writing pulse generator, as well as the transfer pulses in a rhythm which is controlled by the information input via the input *e*, thus ensuring the synchronization at the input side.

Via the OR-gate O2 (Fig. 1) the transfer pulses from the flip-flop output *f*11 as well as the secondary pulses from IG are combined and fed to the input *z* of the counter Z. The corresponding pulse sequence is likewise shown as a curve *z* in Fig. 2.

Since, at the end of one reading rhythm, the pulse generator IG will come to a standstill, unless there is a nonapplication of an information, the pulse edge at the end of the reading rhythm will relax the flip-flop circuit via the AND-gate U2, thus delivering a transfer pulse via *f*11. Special care will have to be taken to effect a corresponding separation with respect to time between the last secondary pulse from the reading rhythm and the transfer pulse which is lying at the beginning of the next successive writing rhythm. For this reason it is appropriate to arrange the connections at the pulse generator in such a way that the transfer pulses for the counter are derived from the leading edges, and the reading pulses from the trailing edges of the output pulses of the pulse generator. In this way it will be achieved that the counter by the respectively last secondary pulse is already stepped-on when transfer pulses are applied.

Furthermore and by the derivation of the reading pulses from the trailing edges of the output pulses of the pulse generator care is taken that the reading pulse generator of the output circuit will only deliver reading pulses after the counter has already been stepped-on.

For controlling the reading processes there is provided, as mentioned hereinbefore, the AND-gate U3 via which the connection with the output circuit may be separated. However, in some cases of application it may still be more favorable to provide, instead of this AND-gate U3, an AND-gate U4 between the timing device and the pulse generator, as is indicated in Fig. 1 by the dashlines. By means of the AND-gate U4 it is not only possible to suppress the generation of reading pulses, but also the generation of the secondary pulses may be suppressed thereby. Accordingly, for releasing or respectively suppressing the reading processes via a reading control lead *st* a reading gate designed as an AND-gate is either arranged subsequently to, or is arranged to precede the pulse generator. The free output of this reading gate is connected with the reading control lead *st*. Preferably the reading gate will be arranged in the reading pulse line.

By suitably actuating the control lead via a further logical network (e.g. LN2) it is now possible, in accordance with the invention, to determine various operating conditions of the arrangement.

For reading during one reading process, only that particular information which, within the order of sequence of the stored informations assumes the lowest position, the reading control lead will be connected with the output of an output-supervisory circuit. This causes the blocking of the reading gate as soon as, by a reading pulse, an information has been transmitted to the output register in the output circuit. Thus, during the further rotation of the counter within the respective reading cycle, as well as during the subsequently following reading cycles, no further reading pulses can be transferred from the reading pulse generator until the output register has been erased again. In the embodiment according to Fig. 1, the output supervision is designed as a logical network LN2. This circuit or network consists of an OR-gate O3 which is connected either to the output *a* or to a corresponding output register in the output circuit A. The OR-gate O3 is followed by an inverter stage I*n*V2, as well as consisting of an AND-gate U5 and of a flip-flop circuit FF2. In the logical network LN2 the control leads of FF2 are connected with the outputs of the OR-gate O3 and of the AND-gate U5. The output of I*n*V2 is connected with the one input of U5. The other input of U5 is connected with the output of the timing device TG. The output of the stage 1 of the flip-flop FF2 is connected with the control lead *st* which, via U3, releases the connection between the reading line *r* and the reading pulse generator LG as long as FF2 is tilted into its position 1.

The mode of operation of the output supervisory circuit is explained by the pulses as shown in Fig. 1 and by the curves *r*, LG, *a* and *f*21 in Fig. 2. The busy-condition of the output circuit is indicated by a lower potential, and the free condition or output interval by a higher potential. In the example, according to Fig. 2, curve *a*, the free-condition is only assumed to exist once. At the beginning of a busy-condition FF2 will be tilted into its position 2 and via I*n*V2 the gate U5 will be blocked. At the beginning of the next successive free-condition the gate U5 will be unblocked so that the leading edge of the next writing rhythm from the timing device will act to tilt the flip-flop circuit FF2 back into its position 1, thus energizing the output *f*21, as is indicated by the arrows in Fig. 2.

By means of this and via the control lead *st* the reading gate U3 will be unblocked, and by the reading pulses *r* the reading pulse generator LG will be energized during the subsequently following reading rhythm. Curve LG in Fig. 2 shows the input pulses at the reading pulse generator. It is assumed that three of the sensed storage lines do not contain an information and that only by the fourth reading pulse an information will be transmitted to the output circuit. At the beginning of the new busy-condition, FF2 will again be tilted into position 2 via the gate O3. Accordingly, *f*21 is no longer energized and, consequently, U3 is blocked to further reading pulses *r*. The same process will be repeated during the next free-condition.

For the reading in dependency upon the number of the writing or storing processes the reading control lead is appropriately connected with one of the counting stages of the counter, as is indicated by the dashlines in Fig. 1. Since, in this case, the entire contents of the storage device normally will be read, the reading gate will appropriately be connected, similar as U4, between the timing device and the pulse generator. This requires, however, in this case that the informations at the output A be also read with the frequency of the pulses generator. Further requirements regarding the releasing of reading processes may be considered when the reading gate is being designed as a multiple coincidence gate.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In a data-processing system, a buffer storage containing a plurality of groups of storage units, connecting means for respective ones of said groups of storage units, a ring counter for separately and successively marking the said connecting means to condition the associated groups of storage units for storage operations and for reproduction operations, input means for storing incoming information occurring in an irregular sequence on the group of storage units associated with any marked connecting means, output means for reproducing, in an unchanged order of sequence, the information stored on the group of storage units associated with any then marked connecting means, irregularly occurring input interval and output interval signals, first and second logical networks, pulse means, means controlled by the first logical network and the pulse means during the occurrence of said input interval signals for operating and restoring the input means, means controlled by the second logical network and the pulse means during the occurrence of each output interval signal for controlling the output means in the interval between operations of the input means, and means controlled by the said first and second logical networks and said pulse means for controlling the ring counter to mark the connecting means for conditioning the associated group of storage units for recording operations during the input interval signals and for reproducing operations during the output interval signals.

2. In a data-processing system according to claim 1, a timing generator included in said pulse means for generating an endless series of timing pulses of fixed duration and spacing, a control pulse generator for generating successive groups of control pulses, each group of control pulses corresponding in time to the duration of one timing pulse, the said means for controlling the operation and release of the input means including means for generating energizing and releasing pulses having time positions corresponding to the termination of the first timing pulse occurring during each input interval signal.

3. In a data-processing system according to claim 2, the said means for controlling the output means including means for generating read-out interval pulses having a leading edge corresponding to the releasing pulse and having a trailing edge corresponding to the termination of the output interval signal.

4. In a data-processing system according to claim 1, a flip-flop circuit in the first logical network having its outputs connected to the said input means and to the ring counter respectively, a first control circuit for the flip-flop circuit including a normally blocked first "and" gate controlled by an "or" gate and by said pulse means, a second control circuit for the flip-flop circuit including a normally blocked second "and" gate controlled by the said pulse means and by the said "or" gate and a serially related inverter, and means controlled by the said "or" gate and said inverter for alternately opening the first and second "and" gates during the occurrence and non-occurrence of said input interval signals.

5. In a data-processing system according to claim 2, the said means for controlling the ring counter includes means for transmitting the said groups of control pulses to the ring counter to cause the successive conditioning of all groups of storage units to reproduce the information stored in each of said groups of storage units.

6. In a data-processing system according to claim 1, a flip-flop circuit in the second logical network having an output connected to the output means and an input controlled by the output means, whereby the read-out pulses from the lowest group of storage units operates the flip-flop circuit to disable the said means for controlling the output means.

7. In a data-processing system according to claim 6 wherein the ring counter includes a plurality of counting stages corresponding respectively to the said connecting devices and wherein the second logical network controls one of said stages of the ring counter.

8. A data-processing system according to claim 2 wherein the means for controlling the said counter includes means for generating stepping pulses having a time position corresponding to the leading edges of said control pulse and reading pulses having a time position corresponding to the trailing edges of said control pulses.

References Cited in the file of this patent

UNITED STATES PATENTS

| | | |
|---|---|---|
| 2,702,380 | Brustman | Feb. 15, 1955 |
| 2,801,334 | Clapper | July 30, 1957 |
| 2,817,072 | Kun Li Chien | Dec. 17, 1957 |